Feb. 6, 1968     D. L. FITTON     3,367,628
MOVABLE VANE UNIT
Filed Oct. 31, 1966
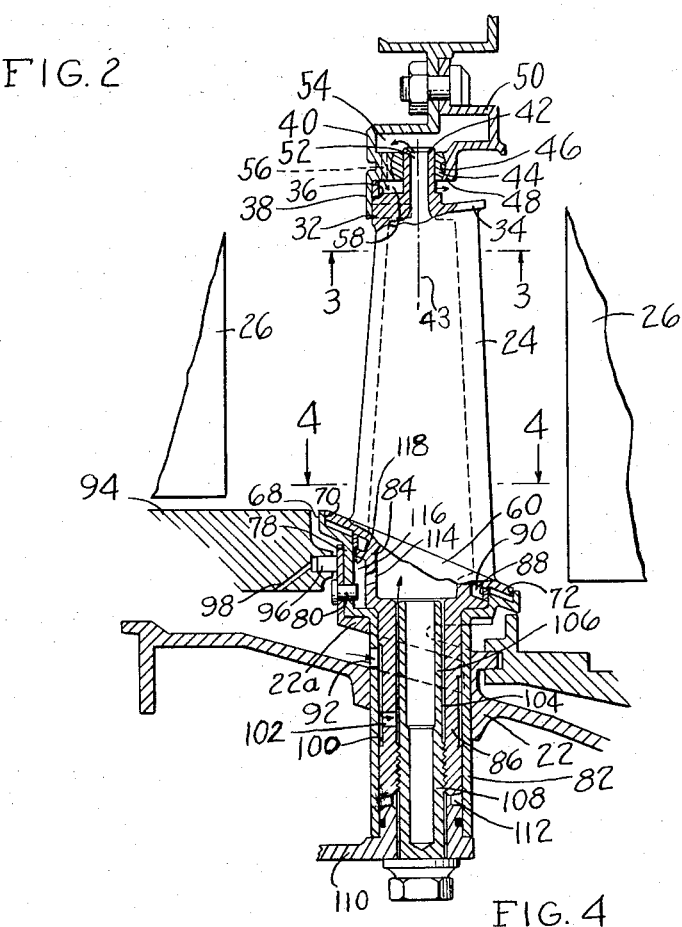
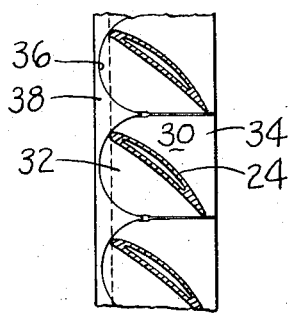
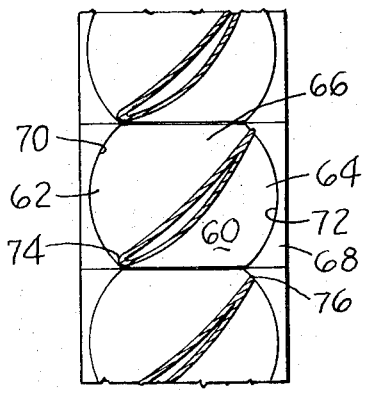
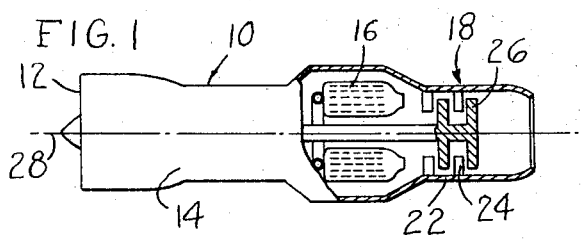
INVENTOR
DAVID L. FITTON
BY Fishman + Van Kirk
ATTORNEYS United States Patent Office 3,367,628
Patented Feb. 6, 1968

3,367,628
MOVABLE VANE UNIT
David L. Fitton, East Hartford, Conn., assignor to United Aircraft Corporation, East Hartford, Conn., a corporation of Delaware
Filed Oct. 31, 1966, Ser. No. 590,809
10 Claims. (Cl. 253—39.1)

This invention relates to a movable vane unit for a fluid flow system. More particularly, this invention relates to a movable vane unit for a turbine vane assembly and a sealing arrangement for the vane unit to prevent or minimize leakage of system fluid.

In many gas turbine installations it is desirable to rotate turbine stator vanes in order to vary the air flow area between the vanes. The rotation of turbine stator vanes is of particular interest in high performance gas turbine aircraft engines, especially in the downstream stage or stages of an engine having more than one stage of turbine stator vanes. However, an effective rotating vane arrangement must minimize leakage of the system fluid by an appropriate sealing provision and allow for deflection of the vanes caused by such factors as thermal distortion.

The problem of providing an effective sealing arrangement to prevent or minimize leakage of system fluid is of major concern. System performance can be adversely affected to a serious degree by excessive fluid system leakage, and this problem can be aggravated if leakage varies with changes in position of the stator vanes. The problem is of particular concern in aircraft gas turbine engines where the turbine system fluid is the combustion gas which is exhausted rearwardly to produce forward thrust. Leakage of the combustion gases around the rotatable turbine vane structure not only reduces the amount of gas from which work can be extracted in the turbine for driving the compressor but also reduces the gas mass available for rearward exhausting in the thrust production process and can also cause overheating of otherwise cooler areas.

Deflection of the rotatable stator vanes other than about the axis of rotation poses both a leakage problem and a problem of insuring continued vane rotatability. The movement of concern is from such factors as thermal distortion which may cause uneven expansion between ends of the rotatable vane unit. Provisions must be made to insure that such movement will not result in leakage of system fluid or interfere with rotating the vane.

The present invention will be described in connection with an aircraft gas turbine engine; however, it will be understood that the invention is equally applicable to any turbomachinery assembly, either turbine unit or compressor unit, in which it is desired to provide rotating stator vanes.

In the present invention rotatable stator vanes are arranged in an annular array about the engine axis. Each rotatable stator vane has a general air foil shape in cross section, and the ends of the vane enlarge into inner and outer end platforms having circular sections or segments. The platforms fit into correspondingly shaped cavities in inner and outer housings, and the housings cooperate to form inner and outer rings defining the vane end boundaries. The outer housing is rectangular in cross section and has a face surface which may be inclined at an angle to the axis of vane rotation for performance considerations. The vane outer end platform has a similarly inclined surface face cooperating with the inclined surface of the outer housing to provide a substantially continuous inclined surface when the vane is in its non-rotated position. A pressurized sealing ring provides sealing between the outer end platform structure and outer housing. The inner housing is formed as part of the stage-dividing diaphragm structure, and a ball joint bearing at the inner end of the vane unit allows for both radial movement of the vane as well as relative rocking movement between the diaphragm and the vane.

A high pressure and relatively low temperature air, such as compressor discharge air, is circulated through both vane end housing structures and through the vane itself both for cooling purposes and to minimize leakage of hot turbine gases. The cooling flow is at a higher pressure than the turbine working fluid, and the cooling system flow serves to minimize turbine working fluid leakage both by pressurizing sealing elements and by providing a flow path from the housing structure into the turbine flow stream at points of possible leakage.

Accordingly, one object of the present invention is to provide a novel rotatable stator vane and sealing arrangement for a turbomachinery installation.

Another object of the present invention is to provide a novel rotatable stator vane and sealing arrangement for a gas turbine engine.

Still another object of the present invention is to provide a novel rotatable stator vane and seal arrangement particularly suitable for use in the turbine unit of a gas turbine engine.

Still another object of the present invention is to provide a novel rotatable stator vane and seal arrangement particularly suitable for use in the turbine unit of an aircraft gas turbine engine.

Still another object of the present invention is to provide a novel rotatable stator vane and seal in which fluid pressure contributes to the sealing arrangement.

Still another object of the present invention is to provide a rotatable stator and seal unit in which the cooling fluid for the system contributes to the sealing arrangement.

Still another object of the present invention is to provide a novel rotatable stator vane and seal unit which allows for deflection of the unit without impairing rotatability or sealing.

Other objects and advantages will be apparent from the following detailed description and drawings.

In the drawings:

FIGURE 1 is a representative showing of an aircraft gas turbine engine.

FIGURE 2 is a sectional elevational view of a movable stator vane and seal unit of a stator assembly in accordance with the present invention.

FIGURE 3 is a view along line 3—3 of FIGURE 2 looking at the inner end of the stator assembly.

FIGURE 4 is a view along line 4—4 of FIGURE 2 looking at the outer end of the stator assembly.

Referring now to FIGURE 1, an aircraft gas turbine engine 10 is shown. Engine 10 has an air inlet 12, a compressor section 14, a combustion section or burners 16, a turbine section 18 and an exhaust nozzle 20. Turbine section 18 has an outer annular casing 22 around the interior of which are placed one or more stages of turbine stator vanes 24, each stage delivering air to a stage of rotor blades 26. Stator vanes 24 are in an annular array around engine axis 28, and at least some of the stator vanes 24 are rotatable about axes radial with respect to axis 28.

The basic operation of the engine of FIGURE 1 is in accordance with the well known operation of gas turbine engines. Air enters inlet 12, is compressed in compressor section 14 and is then delivered to burners 16 where fuel is added and burned to produce a high energy, high temperature gas stream. The combustion gas stream is then expanded through turbine section 18 where work is extracted by the turbine rotor 26 to drive the compressor, and the combustion gas stream is then discharged rearwardly of the engine through exhaust nozzle 20, generating forward thrust. Rotation of stator vanes 24 varies the flow area between the stators and thus can regulate the velocity and direction of gas flow through the turbine to suit various performance requirements.

Referring now to FIGURE 2, the details of one rotatable stator vane unit are shown, the entire structure shown at FIGURE 2 sometimes being referred to as a vane unit or stator unit. A stage of rotor 26, rotatable stator vane 24 and another stage of rotor 26 are shown in series flow relationship for the flow of combustion gases from burner 16 left to right through the turbine unit, and it will be understood that engine axis 28 is located some distance above FIGURE 2. The interior of stator vane 24 is hollow for the passage of a coolant. The coolant may be high pressure compressor discharge air which also flows through the end sections of the vane unit. The coolant flow path will be described in more detail hereinafter.

Referring now to both FIGURE 2 and FIGURE 3, vane 24 has a general airfoil shape in cross section, and the airfoil shape expands to an inner platform 30 which has a circular segment 32 of approximately semicircular shape at the leading end of the vane and a rectangular section 34 at the trailing end of the vane. Circular section 32 fits in and is housed in a correspondingly shaped recess 36 in an inner housing 38. Housing 38 is supported by and is an extension of engine diaphragm 40, diaphragm 40 being an annular casing divider element which may be supported by vanes 24 between stages of the turbine assembly or which may be fixed to engine structure. Inner housing 38 also extends around the axis of the engine as an annular structure at the inner end of the stator vanes. Housing 38 forms a ring with recesses 36 forming a series of scallops in the ring with a platform 30 in each scallop. The rectangular sections 34 of adjacent platforms are separated by approximately .020″ to allow rotation of the platforms.

A neck 42 at the inner end of the vane unit is supported by a bearing element 44, the outer surface of bearing element 44 being in the form of a ball section which is contained in a correspondingly shaped opening 46 in a bearing housing assembly 48. Part of the opening 46 is formed in diaphragm structure 40, and part is formed in support element 50 which is fastened as shown to diaphragm 40. The inner surface of ball section bearing 44 is cylindrical, and the section on neck 42 with which it makes contact serves as a journal. The circular shape of ball section bearing 44 allows for slight rocking movement of vane 24 without destroying the bearing-journal support arrangement between bearing 44 and neck 42.

A passageway 52 in neck 42 leads from the hollow interior of vane 24 to a chamber 54, and a passageway 56 in housing 48 leads from chamber 54 to a chamber 58 between housing 48 and the leading semicircular section 32 of inner platform 30. Coolant from the hollow interior of vane 24 passes through passageway 52 to annular chamber 54, and then passes via passageway 56 to chamber 58 and thence rearwardly as indicated by the arrow to join the turbine working fluid stream. The flow of coolant as just described serves a dual purpose. First, it serves to cool the vane unit inner end structure. Secondly, it contributes to minimizing the leakage of combustion gases between the semicircular section 32 of inner platform 30 and the correspondingly shaped recess 36. A close sizing between the mating portions of recess 36 and semicircular section 32, with tolerances permitting a maximum gap of only .004 inch, serves to minimize leakage of turbine working fluid in between the semicircular section and the recess, and the higher pressure fluid in chamber 58 causes any leakage flow to be from chamber 58 into the turbine working fluid to further minimize chances of turbine fluid leakage.

Referring now to FIGURE 2 and FIGURE 4, the outer end of each vane 24 expands from its airfoil shape to an outer platform 60 having a circular segment 62 at the leading edge of the vane and also having a circular segment 64 at the trailing edge of the vane, circular segments 62 and 64 being joined by a substantially rectangular section 66. Outer platform 60 is housed within an outer housing 68 which has circularly shaped openings 70 and 72 to receive circular segments 62 and 64, respectively. The sides of housing 68 between recesses 70 and 72 are open, and the sides of rectangular section 66 normally extend between recesses 70 and 72 as a continuation of the sides of outer housing 68. Housings 68 at the end of each vane cooperate to form an outer annular ring for the vanes.

As can be seen in FIGURE 4, adjacent housings 68 abut each other and are in sealing contact during engine operation to minimize leakage of turbine fluid, and the gap between the straight edged sides of adjacent rectangular sections 66 is on the order of .020″. This separation between the rectangular sections 66 of adjacent outer platforms 60 allows for slight rotation of the vanes about the axis 43 of neck 42 while at the same time minimizing leakage of turbine fluid between housings 68. This slight allowable rotation is sufficient to provide a change in direction and velocity of turbine fluid passing between the stator vanes to vary turbine performance.

As can best be seen in FIGURE 2, the leading end of outer housing 68 may be longer than the trailing end so that the supper surface of outer housing 68 is inclined at an angle with respect to axis 43. Similarly, the upper surface of platform 60 is inclined at the same angle as the inclination of the upper surface of housing 68 so that the upper surface of housing 68 and the upper surface of platform 60 combine to form a substantially uniform surface inclined at an angle other than normal with respect to axis 43. The inclined surface provides a preferred flow contour for the turbine working gases passing between the stator vanes.

Rectangular housing 68 merges to a cylindrical bushing 78 which is seated in a section 22a of casing 22 and which is secured against rotation by pin 80, and bushing 78 has an extending hollow cylindrical section 82. Cylindrical section 82 is pressed into outer casing 22 with an interference fit to prevent leakage of system fluid to the outside. A cylindrical portion 84 extends from the underside of platform 60 within bushing 78, and cylindrical portion 84 merges into a hollow cylindrical member 86 within hollow cylindrical element 82.

A sealing ring 88 is housed within a recess 90 on the under side of platform 60, and both ring 88 and recess 90 are at an angle to axis 43 conforming to the angle of the upper surface of the platform and housing in order to be parallel to the flow path contour of the turbine fluid and to minimize leakage. Both ring 88 and recess 90 are circular about axis 43 to allow rotation of vane 24 without impairing the sealing function of the ring.

High pressure compressor discharge air is delivered to a passageway 92 in cylindrical element 82 to serve as a cooling fluid. The compressor discharge air is separated from the hot turbine fluid by a casing element 94 which has a sealing ring with one surface in contact with casing 22a and which is pressurized at the other surface via a passageway 98. It will be understood that casing 94, sealing ring 96 and casing 22a are annular about engine axis 28 and provide a complete separation between the turbine working fluid and the compressor discharge air coolant.

After entering passageway 92, the coolant flows through a chamber 100 and thence via a passageway 102 through a narrow passageway 104 for delivery to the hollow interior of vane 24. The cooling fluid then flows through passageway 52 and neck 42 and is then discharged via chamber 54, passage 56 and chamber 58 as previously described.

Passageway 104 is a narrow passageway formed between an extension 106 of a bolt 108, and the narrow passageway 104 causes a rapid flow of cooling air to reduce differential thermal expansion of mating surfaces in the outer end structure of the vane unit.

Bolt 108 is threaded to member 86 and retains actuating lever 110 which is connected to member 86 by a face spline 112. Rotation of actuating lever 110 is transmitted through face spline 112 to cylindrical member 86 and thus causes rotation of vane 24 about axis 43.

The cooling fluid passing through vane 24 is also delievered via a passageway 114 to a chamber 116 under platform 60. From chamber 116 the pressurized cooling fluid passes through a slight gap 118 to the underside of sealing ring 88 to urge ring 88 upward into sealing contact with the bottom of platform 60. The pressurized coolant also fills chamber 90 to urge sealing ring 88 outward into sealing engagement with the interior surface of bushing 78.

The exterior surfaces of cylindrical member 86 which are in contact with the interior surfaces of bushing cylindrical element 82 are hard faced by being provided, for example, with a chrome carbide coating. These hard faced surfaces show low friction and low wear at high temperatures. The internal surfaces of bushing cylindrical element 82 in contact with the exterior hard faced surfaces of cylindrical member 86 are coated with a heat resistant solid lubricant such as molybdenum disulfide compound. Thus, these rubbing surfaces are characterized by extremely low friction and low wear at high temperatures. The entire outer housing structure including outer rectangular housing 68, and bushing 78 with extending cylindrical element 82 constitutes a bushing insert, and the use of this bushing insert structure allows the use of bearing materials which differ from the case material so that easy replacement of the bearing material is possible in the event that wear occurs. As a further feature, rectangular housing 68 serves as a heat barrier between case 22 and the hot turbine working fluid. Since outer housing 68 is free to expand independently of case 22, thermal stresses in case 22 are substantially reduced.

As will be apparent to those skilled in the art, a substantial temperature differential may exist in the area of the outer end of the stator unit. The structure on the interior side of casing 22 is exposed to hot combustion gases while the structure on the exterior side of housing 22 is exposed to temperatures approaching ambient temperature. Thus, a substantial temperature differential can exist across casing 22. Furthermore, this temperature differential is subject to variation with changes in either combustion gas temperature or ambient temperature and changes in this temperature differential can result in an expansion or contraction of parts and thus result in a deflection of vane 24 at an angle to its axis of rotation, especially fore or aft, if diaphragm structure 40 is fixed to engine structure. In the event that such movement does occur, the movement will be transmitted to ball section bearing 44, and ball section bearing 44 will pivot or rock in its housing 48 to allow the entire stator unit to pivot. Since the pivoting or rocking motion of ball section bearing 44 in its housing allows the entire stator unit to pivot as a single unit, all of the sealing structure described above remains intact and the sealing integrity remains undisturbed.

In the event that diaphragm 40 is supported by vanes 24, ball section bearing 44 allows pressure induced movement of the diaphragm relative to the vane without impairing the sealing integrity or rotatability of the unit.

Radial motion of the inner end of the vane toward or away from the engine's centerline is allowed by sliding of the cylindrical contact surfaces between neck 42 and bearing 44.

While a preferred embodiment has been shown and described, various modifications and substitutions may be made without departing from the spirit and scope of this invention. Accordingly, it is to be understood that this invention has been described by way of illustration rather than limitation.

What is claimed is:
1. A movable vane unit for a fluid flow system including:
   a vane having
      a body section of general airfoil shape in cross section,
      a first end platform at one end of said body section, at least part of said first end platform being circular in shape, and
      a second end platform at the other end of said body section, said second end platform having a circular segment;
   a first housing for said first end platform, said first housing having an opening at least partly circular in shape and conforming in shape to said circular shape of said first end platform, and said first housing receiving said first end platform;
   sealing means between said first end platform and said first housing for preventing leakage between said first housing and said first end platform;
   means for imposing a pressure differential across said sealing means to urge said sealing means into sealing contact with said first housing;
   a second housing for said second end platform, said second housing having a circular segment for receiving said circular segment of said second end platform;
   a journal element extending from said second end platform;
   bearing means rotatably supporting said journal element to allow rotation of said one vane about a predetermined axis;
   housing means for said bearing means;
   a ball section on said bearing means to allow relative angular movement between said housing means and said vane; and
   actuating means connected to said first end platform to rotate said vane about said predetermined axis.

2. A movable vane unit as in claim 1 wherein:
   said first housing is substantially rectangular in cross section; and wherein
   said first housing has a first surface inclined at an angle with respect to said predetermined axis of rotation.

3. A movable vane unit as in claim 2 wherein said first end platform has a first surface inclined at an angle with respect to said predetermined axis of rotation, said first surface of said first housing and said first surface of said first end platform cooperating to form a substantially continuous surface in a plane inclined at an angle with respect to said predetermined axis.

4. A movable vane unit as in claim 3 wherein said angle of inclination of both said first surface of said first end platform and said first surface of said first housing is other than normal to said predetermined axis.

5. A movable vane unit as in claim 4 wherein:
   said first surface of said first end platform has first and second circular segments and a rectangular segment therebetween.

6. A movable vane unit as in claim 4 wherein:
   said sealing means includes a sealing ring having one surface in contact with said first housing, said sealing ring being disposed in a plane parallel to said plane formed by said substantially continuous surface.

7. A movable vane unit as in claim 6 wherein:
   said means for imposing a pressure differential across said sealing means includes means for delivering a pressurized fluid of higher pressure than system fluid to the side of said sealing ring removed from said first housing.

8. A movable vane unit as in claim 1 wherein:
   said body section is hollow for the passage of a cooling fluid; and wherein
   said first housing has an extending section for the passage of a cooling fluid, said cooling fluid passing from said extending section to said hollow body section.

9. A movable vane unit as in claim 8 wherein:
said extending section is a conduit having inner and outer surfaces, and including;
means for delivering said cooling fluid to at least part of each of said inner and outer surfaces.

10. A movable vane unit as in claim 1 wherein:
said second end platform has a substantially semicircular segment and a rectangular segment extending therefrom; and wherein;
said second housing has a scalloped shape substantially conforming to said semicircular segment except in the vicinity of said rectangular segment.

References Cited

UNITED STATES PATENTS

| 2,930,579 | 3/1960 | Boyd et al. | 253—78 X |
| 3,224,194 | 12/1965 | De Feo et al. | 253—39.1 X |

FOREIGN PATENTS

| 1,101,346 | 4/1955 | France. |
| 1,325,261 | 3/1963 | France. |
| 755,527 | 8/1956 | Great Britain. |
| 946,185 | 1/1964 | Great Britain. |

EVERETTE A. POWELL, JR., *Primary Examiner.*